US012443972B2

(12) United States Patent
Crinon

(10) Patent No.: US 12,443,972 B2
(45) Date of Patent: *Oct. 14, 2025

(54) USE OF LOCALIZED BROADCAST SIGNALS TO MODIFY MOBILE APPLICATION BEHAVIOR

(71) Applicant: Beelinx USA, L.L.C., Plano, TX (US)

(72) Inventor: Guillaume Crinon, Douvres-la-Delivrande (FR)

(73) Assignee: Beelinx USA, L.L.C., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/773,125

(22) Filed: Jul. 15, 2024

(65) Prior Publication Data
US 2025/0191024 A1 Jun. 12, 2025

Related U.S. Application Data

(63) Continuation of application No. 18/097,937, filed on Jan. 17, 2023, now Pat. No. 12,039,566, which is a continuation of application No. 17/834,624, filed on Jun. 7, 2022, now abandoned, which is a continuation of application No. 17/141,938, filed on Jan. 5, 2021, now abandoned, which is a continuation of (Continued)

(51) Int. Cl.
G06Q 30/02 (2023.01)
G06Q 30/0242 (2023.01)
G06Q 30/0251 (2023.01)

(52) U.S. Cl.
CPC ..... G06Q 30/0246 (2013.01); G06Q 30/0242 (2013.01); G06Q 30/0261 (2013.01)

(58) Field of Classification Search
CPC .............. G06Q 30/0246; G06Q 30/02; G06Q 20/3224; G06Q 30/0267; G06Q 30/0601; H04W 4/021
See application file for complete search history.

(56) References Cited

U.S. PATENT DOCUMENTS 6,961,555 B1   11/2005 Philyaw
9,361,630 B1 *  6/2016 Goswami .............. H04W 4/021
(Continued)

FOREIGN PATENT DOCUMENTS

EP   1098289 A2 *  5/2001 ............. G06Q 30/02

Primary Examiner — Saba Dagnew
(74) Attorney, Agent, or Firm — Gregory M. Howison

(57) ABSTRACT

A method is disclosed for tracking advertisement effectiveness. First information associated with desired advertising information is broadcast from at least one of a plurality of fixed information nodes. A mobile unit receives the broadcast information and outputs the desired advertising information. An advertisement counter is started at the time of receipt of the broadcast information and presence information is broadcast from at least one of a plurality of fixed monitoring nodes over a restricted broadcast range, which at least one fixed monitoring node is disposed in a predetermined fixed physical proximity with a vendor location. The broadcast presence information is received at the mobile unit and a presence counter is started in response to receipt of the presence information. At the mobile unit loss of receipt of the broadcast presence information, the presence counter is stopped.

20 Claims, 12 Drawing Sheets

Related U.S. Application Data application No. 15/976,408, filed on May 10, 2018, now Pat. No. 10,885,546, which is a continuation of application No. 13/836,438, filed on Mar. 15, 2013, now Pat. No. 9,972,026.

(60) Provisional application No. 61/639,158, filed on Apr. 27, 2012.

(56) References Cited

U.S. PATENT DOCUMENTS

| | | | |
|---|---|---|---|
| 10,380,658 B2 | 8/2019 | Vengroff et al. | |
| 2002/0062251 A1* | 5/2002 | Anandan | G06Q 30/0267 |
| | | | 705/14.64 |
| 2002/0161633 A1* | 10/2002 | Jacob | G06Q 20/3224 |
| | | | 705/14.64 |
| 2008/0046318 A1* | 2/2008 | Rotholtz | G06Q 30/0601 |
| | | | 705/26.1 |
| 2010/0280874 A1 | 11/2010 | Thorn | |
| 2011/0029370 A1 | 2/2011 | Roeding et al. | |
| 2011/0178863 A1 | 7/2011 | Daigle | |
| 2011/0223895 A1 | 9/2011 | Wagda et al. | |
| 2011/0270673 A1* | 11/2011 | Lin | G06Q 30/0246 |
| | | | 707/E17.014 |
| 2012/0289263 A1* | 11/2012 | Link, II | G06Q 30/02 |
| | | | 455/466 |
| 2020/0034895 A1 | 1/2020 | Vengroff et al. | |

\* cited by examiner

USE OF LOCALIZED BROADCAST SIGNALS TO MODIFY MOBILE APPLICATION BEHAVIOR

CROSS-REFERENCE TO RELATED APPLICATIONS

This application is a Continuation of U.S. application Ser. No. 18/097,937, filed Jan. 17, 2023, entitled USE OF LOCALIZED BROADCAST SIGNALS TO MODIFY MOBILE APPLICATION BEHAVIOR, issuing as U.S. Pat. No. 12,039,566 on Jul. 16, 2024, which is a Continuation of U.S. application Ser. No. 17/834,624, filed Jun. 7, 2022, entitled USE OF LOCALIZED BROADCAST SIGNALS TO MODIFY MOBILE APPLICATION BEHAVIOR, which is a Continuation of U.S. application Ser. No. 17/141,938, filed Jan. 5, 2021, entitled USE OF LOCALIZED BROADCAST SIGNALS TO MODIFY MOBILE APPLICATION BEHAVIOR, which is a Continuation of U.S. patent application Ser. No. 15/976,408, filed May 10, 2018, entitled USE OF LOCALIZED BROADCAST SIGNALS TO MODIFY MOBILE APPLICATION BEHAVIOR, now U.S. Pat. No. 10,885,546, issued on Jan. 5, 2021, which is a Continuation of U.S. patent application Ser. No. 13/836,438, filed Mar. 15, 2013 and entitled USE OF LOCALIZED BROADCAST SIGNALS TO MODIFY MOBILE APPLICATION BEHAVIOR, now U.S. Pat. No. 9,972,026 issuing May 15, 2018. U.S. patent application Ser. No. 13/836,438 claims the benefit of U.S. Provisional Application No. 61/639,158, filed Apr. 27, 2012 and entitled TRACKING ADVERTISEMENT EFFICACY USING AN URBAN MOBILE NETWORK. U.S. application Ser. Nos. 18/097,937, 17/834,624, 17/141,938, 15/976,408, 13/836,438 and 61/639,158 are incorporated by reference herein in their entirety.

BACKGROUND

As the use of internet-enabled mobile devices capable of running complex applications becomes more and more widespread, it has become desirable for advertisers to use a mobile device user's location to modify advertising content that is delivered to the user. Furthermore, it is also desirable to measure the effectiveness of such advertising, especially in the case that the advertisement is intended to incentivize the user to enter a nearby retail location. To that end a system is presented which provides a method of obtaining and delivering information to advertisers which is correlated to a user's movement subsequent to viewing an advertisement.

SUMMARY

The present invention, in one aspect thereof, comprises a method for tracking advertisement effectiveness. First information associated with desired advertising information is broadcast from at least one of a plurality of fixed information nodes. A mobile unit receives the broadcast information and outputs the desired advertising information. An advertisement counter is started at the time of receipt of the broadcast information and presence information is broadcast from at least one of a plurality of fixed monitoring nodes over a restricted broadcast range, which at least one fixed monitoring node is disposed in a predetermined fixed physical proximity with a vendor location. The broadcast presence information is received at the mobile unit and a presence counter is started in response to receipt of the presence information. At the mobile unit loss of receipt of the broadcast presence information, the presence counter is stopped.

BRIEF DESCRIPTION OF THE DRAWINGS

For a more complete understanding, reference is now made to the following description taken in conjunction with the accompanying drawings in which.

DETAILED DESCRIPTION

Figure 1:
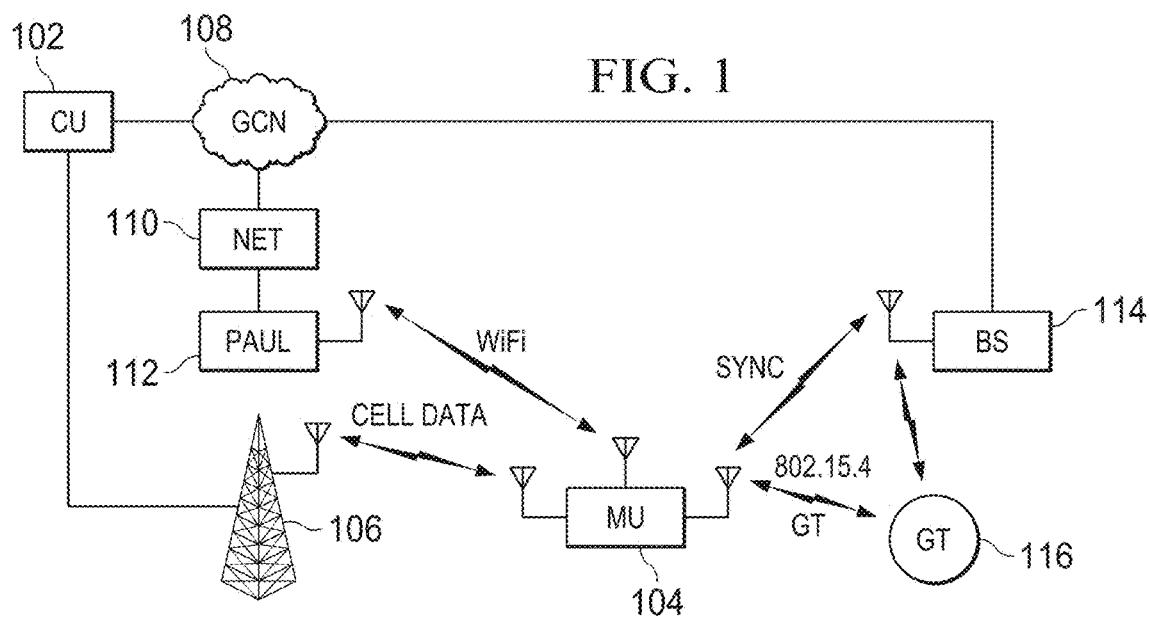
FIG. 1 illustrates a diagrammatic view of a network using geotag.

Referring now to the drawings, wherein like reference numbers are used herein to designate like elements throughout, the various views and embodiments of use of localized broadcast signals to modify mobile application behavior are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Although the preferred embodiment has been described in detail, it should be understood that various changes, substitutions and alterations can be made therein without departing from the spirit and scope of the invention as defined by the appended claims.

The present system allows an advertiser to gauge the effectiveness of a piece of location based advertising by tracking whether or not the recipient of the advertising visited the advertiser's establishment soon after receiving the advertisement. A preferred embodiment of this system uses the urban mobile network system described in U.S. patent application Ser. No. 13/502,040, entitled URBAN MOBILE NETWORK SYSTEM, incorporated herein in its entirety by reference.

Referring now to FIG. 1, there is illustrated an example of an urban mobile network. A central unit 102 contains a memory which has stored within it at least one data structure, which contains multiple data files such as advertisements. This data structure may be transmitted in whole or in part to other devices having a memory in which to store the data structure, such as mobile unit 104. Mobile unit 104 may have multiple antennas for use with a variety of communications protocols. In one embodiment, central unit 102 may be connected to a cellular tower 106 which is operable to transmit the data structure wirelessly via cellular data transmission protocols to the mobile unit 104. In another embodiment, central unit 102 may be connected via a Global Communication Network (GCN) 108, such as the Internet, to a local network 110, which may transmit the data structure via a wireless router 112 using WiFi protocols to the mobile unit 104. In another embodiment, central unit 102 may be connected via a GCN 108 to a base station 114 which operates under a modification of the IEEE 802.15.4 protocol to transmit the data structure to mobile unit 104. The base station 114 additionally communicates with a "geotag" 116 which itself may communicate with base station 114 and mobile unit 104. The geotag 116 contains a small amount of data, for example the latitude and longitude of its own location. When the geotag 116 communicates with the mobile unit 104 it transmits this location data to the mobile unit 104.

Figure 2:
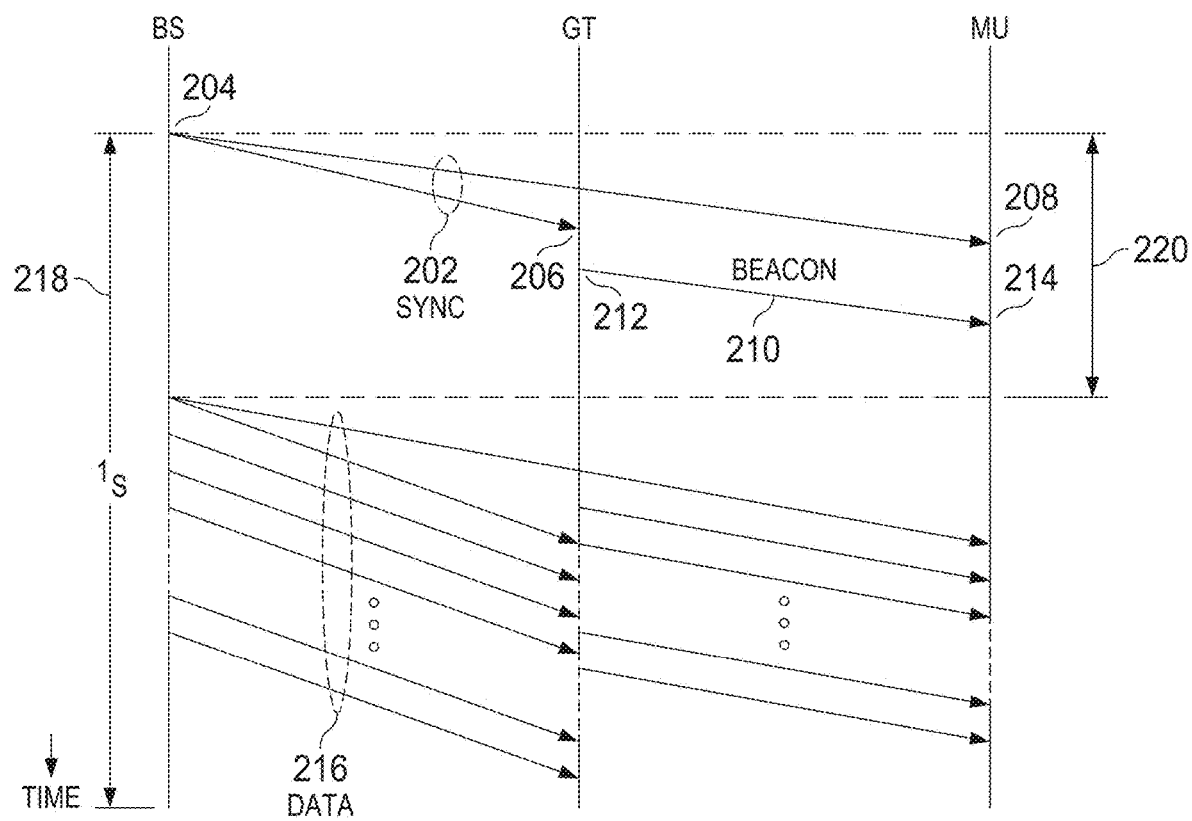
FIGS. 2 and 2A illustrate transmission diagrams for the various beacons and geotag signals.
Figure 2A:
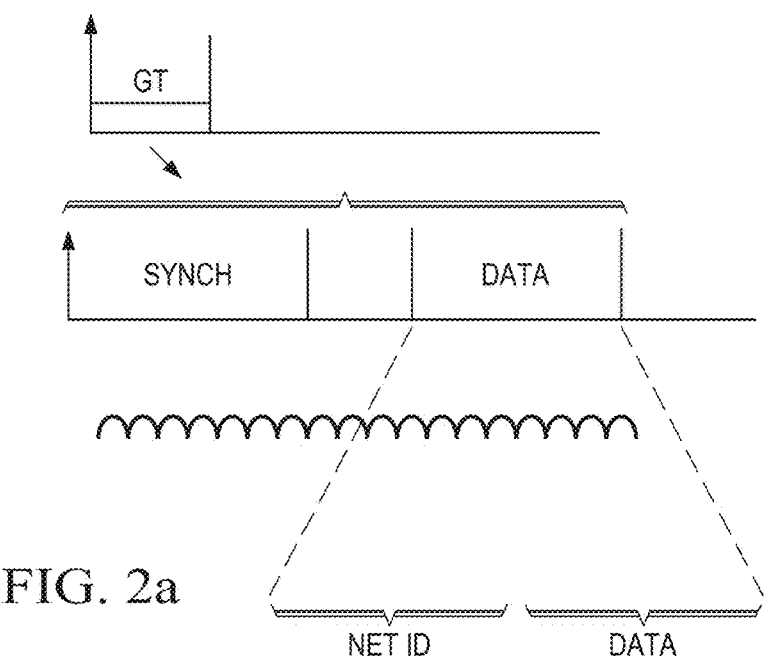

Referring now to FIG. 2, there is illustrated a diagram of communications between the base station 114, geotag 116, and mobile unit 104. In a preferred embodiment, the geotag 116 runs with very little power consumption and thus with a minimum of transmissions. In order to facilitate this, the base station 114 coordinates communication between the geotag 116 and the mobile unit 104. The base station 114 transmits a synchronization (sync) pulse 202 at a time 204 which is received by both the mobile unit 104 and the geotag 116 at times 208 and 206, respectively. When the geotag 116 receives sync pulse 202 it in turn sends out a beacon signal 210 at time 212, which is received by the mobile unit 104 at time 214. After this communication has occurred, the base station 114 performs other data communications 216. Data communications 216 with the mobile unit 104 may contain information such as new advertisements or responses to requests for information from the mobile unit 104. Data communications 216 with the geotag 116 typically contain an update to the location information stored in the geotag 116 or requests for a status update from the geotag 116. In order to ensure that there are no collisions between the geotag's beacon 214 and the base station's data 216 at the mobile unit 204, there is a dead period 220 starting at time 204 and lasting long enough to prevent collision. In a preferred embodiment this entire communication process happens within one second and is repeated cyclically every second. In this way the base station 114 and geotag 116 are continuously broadcasting their information for any mobile unit 104 that comes within their range to receive. FIG. 2A illustrates the timing of the geotag operation and the data structure. Each geotag is operable to be accessed at a particular time after the Synch pulse is generated by the base station. Typically, all geotags have the first time slot reserved.

Figure 3:
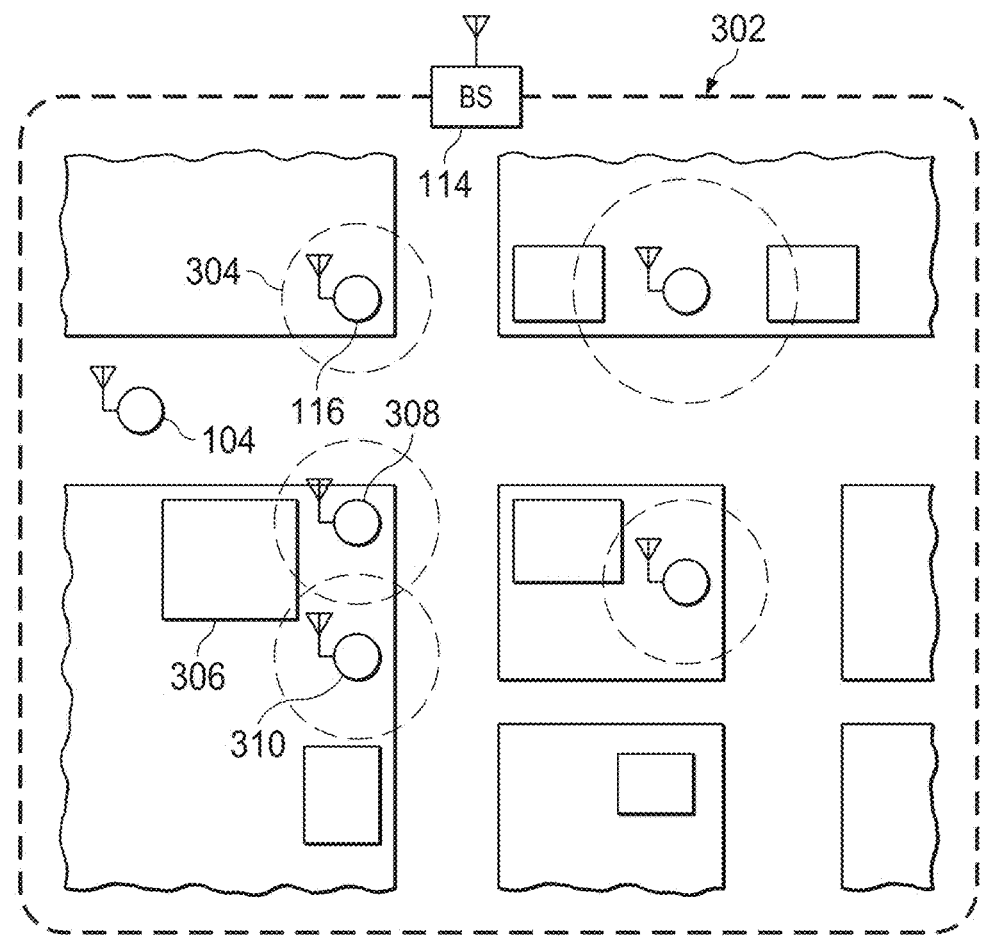
FIG. 3 illustrates a diagrammatic view of a retail establishment utilizing the geotag.

Referring now to FIG. 3, there is illustrated a mobile urban network system in use in an urban environment. A base station 114 transmits a signal within a range 302 defined as the range at which a mobile unit 104 can successfully receive information from the base station 114. Geotags 116 are placed in various areas around the urban area and have a transmission range 304, similarly defined as the range at which a mobile unit 104 can successfully receive information from the geotag 116. The range 304 is significantly smaller than the range 302 because the geotag 116 in this embodiment is operating at very low power. A person carrying a mobile unit 104 moves around the urban environment and in and out of the range of various base stations 114 and geotags 116. When the mobile unit 104 enters the range 304 of a base station 114 and receives a first data communication 216 it learns a number of network IDs, one for each geotag 116 within base station 114's range 302. When the mobile unit 104 moves within the range 304 of any geotag 116 it receives the geotag's beacon 210. The beacon 210 may contain location information such as longitude and latitude, or in another embodiment it may contain reference data for an application in mobile unit 104 which will allow the application to determine its location. Once the mobile unit 104 knows its location it will activate an application which displays one or more advertisements for local establishments, such as establishment 306. These advertisements may be stored in local memory on the mobile unit 104 at a prior time, received from base station 114 or a cellular connection upon entrance within range 302, requested from base station 114 or a cellular connection upon entering the geotag's range 304, or the like. Knowledge of which advertisements have been viewed may also be used interactively by the application in order to modify the behavior of future advertisements. For example, if the mobile unit 104 moves into the area of the specific geotag 308, an advertisement for establishment 306 may be displayed. If the mobile unit then moves near specific geotag 310, knowledge that the mobile unit 104 has passed through the area of specific geotag 308 may be used to discern that the user is moving past the establishment 306, and a more enticing offer might be displayed.

Once an advertisement for establishment 306 has been displayed by mobile unit 104 the viewer may or may not choose to enter establishment 306, but it would be beneficial for the advertiser to know which choice was made.

Figure 4:
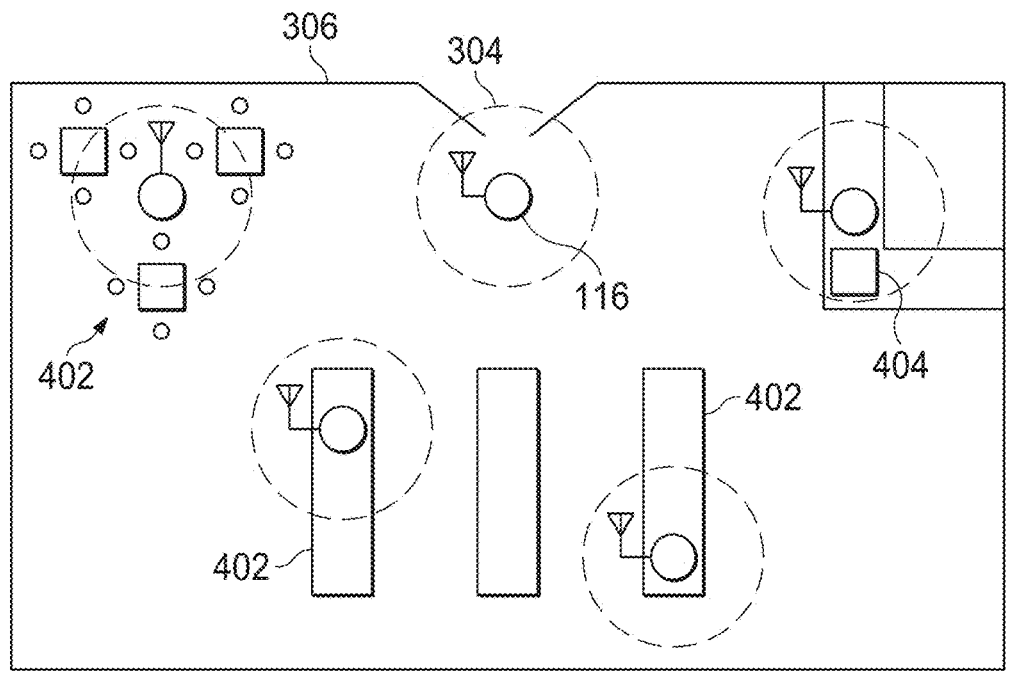
FIG. 4 illustrates a more detailed embodiment of FIG. 3.

Referring now to FIG. 4, there is illustrated the interior of an establishment 306. Within establishment 306 are various points of interest (POIs) 402 which a customer will be expected to visit. Geotags 116 are placed at POIs 402 in order to determine if a customer visits any POIs. If a customer has walked past a geotag 116 outside of establishment 306 and triggered an advertisement within a recent time frame then when the customer visits a POI 402 and enters the range 304 of a geotag inside the establishment, the advertisement application notes that the advertisement has been successful and registers a "geoclick." The application may furthermore track how much time the customer spends at a POI 402 within the range 304 of a geotag 116. This information will be reported back to the central unit 102 through one of the various channels available. Additionally, a point of sale (POS) 404 in an establishment 306 may be within range 304 of a geotag 116 and connected to central unit 102 so that sales may be reported to central unit 102 and correlated with the presence of mobile unit 104 within range of the same geotag 116 in the same time frame as a sale, further determining the effectiveness of an advertisement. Additionally, once the user has entered establishment 306, this knowledge may be used by the application to modify future advertisements offered to the user, for example better offers based on more frequent visits to establishment 306 or offers for partner establishments that the user may be interested on based on their entrance of establishment 306.

Figure 5:
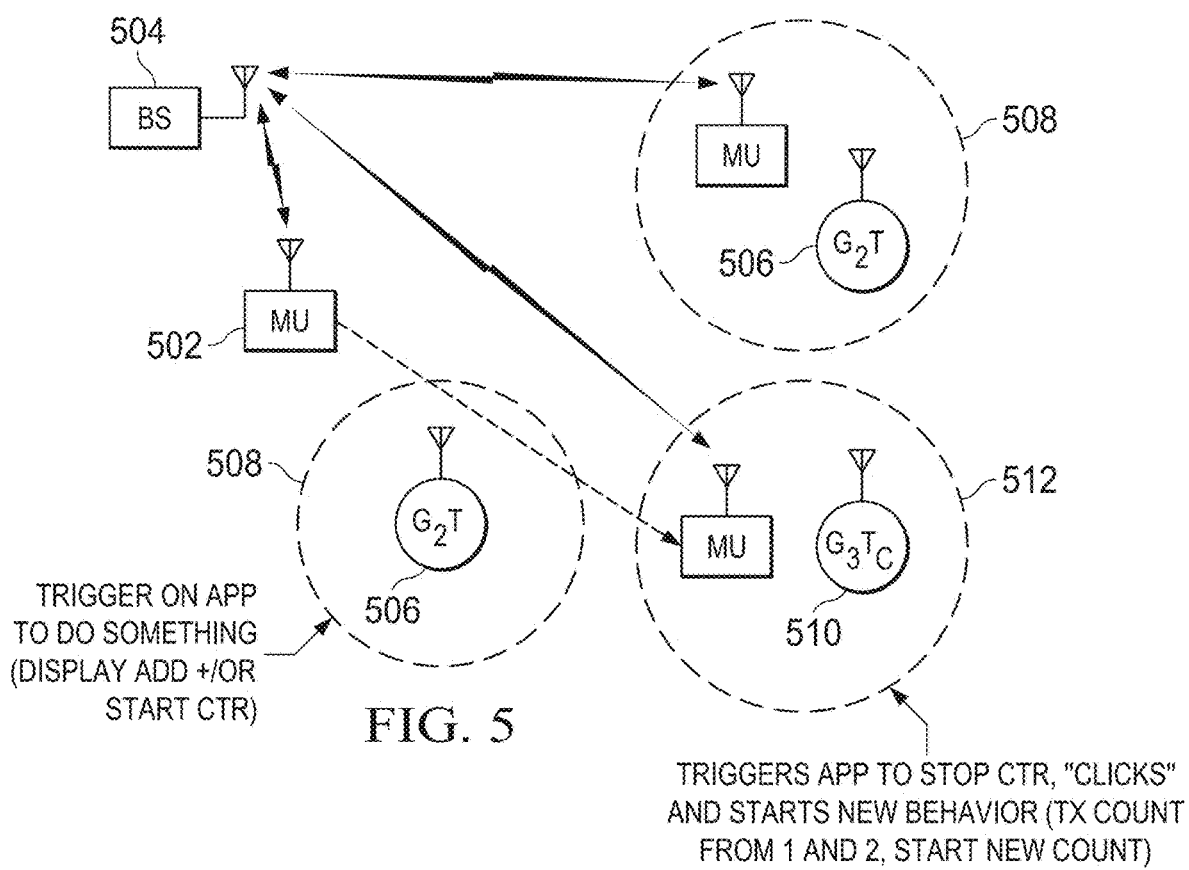
FIG. 5 illustrates a diagrammatic view of the movement of a mobile unit through a group of geotags from one geotag to a click-through geotag.

Referring now to FIG. 5 there is illustrated another embodiment of a mobile network and a system for triggering the display of an advertisement on a mobile device and subsequently tracking the device's movement. Mobile unit 502 is a device such as a smart phone which may have multiple antennas for receiving and transmitting radio signals using a variety of communication protocols. Mobile unit 502 is also capable of running various applications. Base station 104 is a network base station which is capable of forming a bidirectional communication link with mobile unit 502 using a cellular communication protocol or other wireless communication protocol and is capable of providing data which is requested by the mobile unit 502, such as an advertisement. There are multiple "geotags" (GTs) 506 arrayed around the environment. These GTs are small, low power devices which contain a small amount of data and which are capable of communicating with mobile unit 502 within a limited transmission range 506. In an ideal embodiment, the GTs 506 contain a unique identification number (ID) and an instruction for an application running on mobile unit 502. When mobile unit 502 moves into transmission range 508 of a GT 506, GT 506 communicates its data to mobile unit 502. In an ideal embodiment this data triggers an application running on mobile unit 502 to perform a function, for example displaying an advertisement which is in mobile unit 502's memory. There are furthermore arrayed in the environment special "click-through geotags" (CT GTs) 510 which are similar to GTs 506 but which contain different data. When mobile unit 502 enters the transmission range 512 of CT GT 510, the CT GT 510 communicates its data to the mobile unit 502. In an ideal embodiment, this data triggers the application running on mobile unit 502 to perform a function, for example recording data correlating to how long it took the user to move from GT 506's transmission zone 508 to CT GT 510's transmission zone 512 for later transmission to the advertiser via base station 504.

[Further to the operation of the GT 506, this is a radio transmitter utilizing an 802.15.4 transmission protocol. This is a low power transmission protocol. This radio has associated therewith a particular PHY layer and a particular MAC layer in accordance with the operation of the protocol. Also associated with that radio will be an application layer. One application layer is referred to as the ZIGBEE application. However, any type of 802.15.4 application could be run.

In this application, there are multiple modes of operation. In one mode of operation, it may be that the GT 506 is required to communicate with the base station 504 in order to receive information therefrom or to request information. In order to request information, the GT 506 must increase its transmission range. The GT 506 has the ability to control the transmission power, and, therefore, the transmission radius. In normal operations, as will be described herein below, the transmission radius is restricted such that it does not "overlap" with other GTs. However, this is a communication mode with a base station, and, during normal operation, the GT 506 merely transmits information on a periodic basis that can be received by any mobile unit passing within its limited and restricted transmission radius. In accordance with 802.15.4 protocol, there are required certain synchronization signals to be transferred from the base station to synchronize all of the mobile units and the other radios transmitting/receiving on the network. These GTs are designed to transmit within a particular slot such that the mobile unit will recognize a GT when it is within range thereof. Again, the GTs are typically not in an overlapping operation, whereas the 802.15.4 is designed to have overlapping radios.

As a mobile unit traverses a particular area, it occasionally will fall within the transmission range of a GT. At this time, it will receive information from the GT, which is a broadcast operation. The mobile unit does not contact the GT; rather, all it receives is a synchronization signal from the base station synchronizing its receive operation and then a transmission from any GT in whose range it might be within the defined time slot. Each time the synchronizing signal occurs it can look to see if other units are broadcasting, and, if so, information can be determined from those broadcasts. The broadcast can be merely an identification of the device, or, it could contain information such as GPS coordinates or advertising codes. These GPS coordinates would function to give geographic information. Additionally, the ID of a particular unit could be utilized in an application running on a mobile unit to trigger some event therein. These GTs can be placed at any location within a particular environment to achieve the purpose thereof.

In the embodiment illustrated in the FIG. 5, as the mobile unit 502 traverses through the area 508 to the area 512, what occurs is that the first GT 506 associated with the transmission range 508 causes the application to trigger some kind of display advertisement or the such on the mobile unit. This also might initiate a counter when the mobile unit traverses from the GT 506 range to the transmission range 512 associated with a GT 510. What will occur is that a counter will stop and this may start a new behavior. This is the ability to basically determine the amount of time it takes to go from one transmission area to another transmission area. This can be utilized to merely determine the characteristics of the person utilizing the mobile unit, or to determine that the user has moved from one area to another either entering a store or exiting a store.

Figure 6:
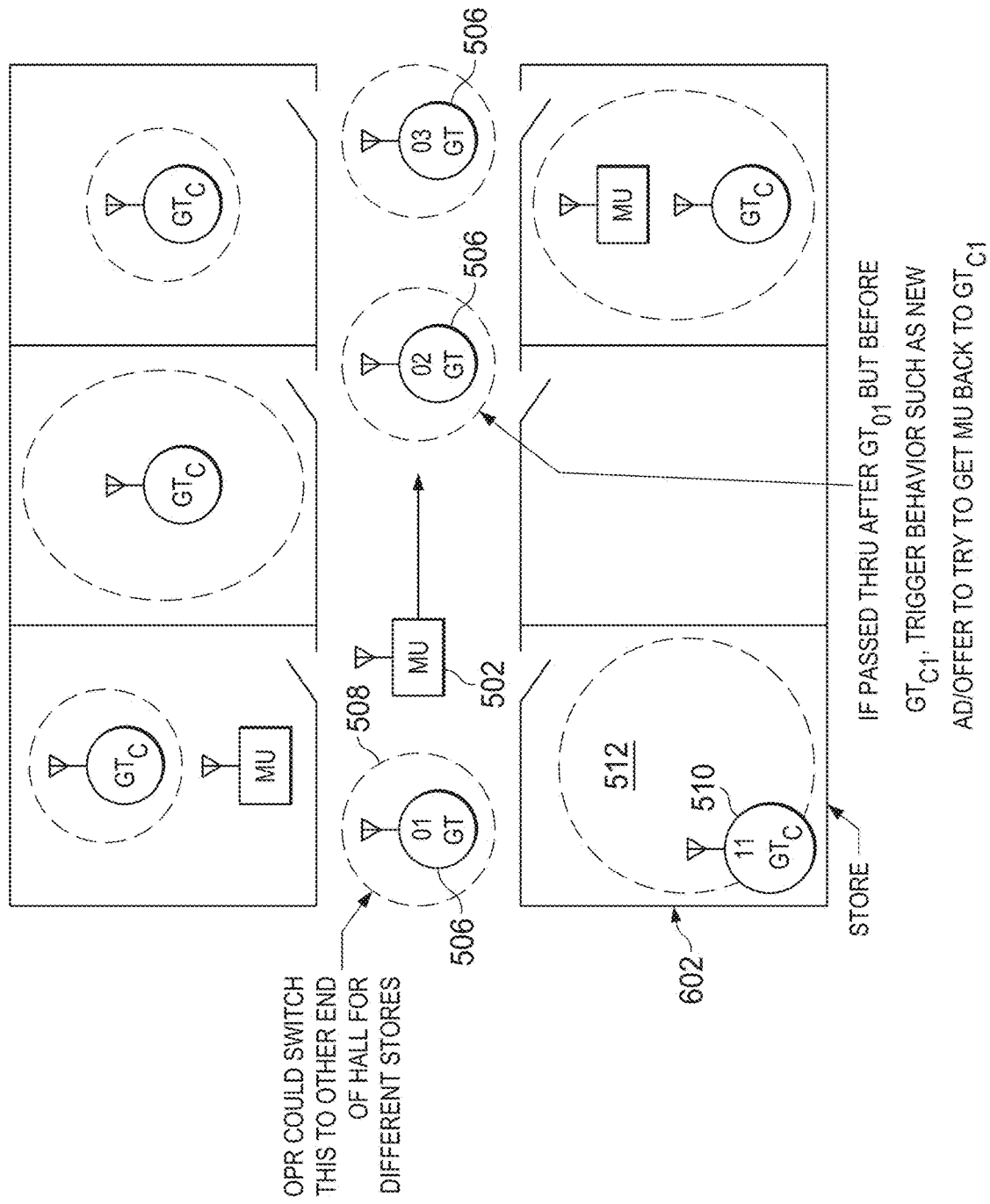
FIG. 6 illustrates an over embodiment to the retail establishment with a mobile unit moving therethrough.

Referring now to FIG. 6, there is illustrated an embodiment of the above system in a shopping mall. As the mobile unit 502 travels down a hallway between stores it may pass by one of various GTs 506 arrayed throughout the hallway. When mobile unit 502 passes through the transmission zone 508 of a GT 506 it receives a trigger from the GT which tells an application running on mobile unit 502 to display an advertisement for store 602 and to begin a timer. If mobile unit 502 enters store 602 it will also enter the transmission range 512 of a CT GT 510. The mobile unit 502 will receive a trigger from the CT GT 510 which tells the application running on mobile unit 502 to stop the timer, save its value and transmit it to the advertiser when possible. In another embodiment, the trigger from the CT GT 510 may also tell the application running on mobile unit 502 to start a new timer, to stop this timer when the mobile unit 502 leaves the transmission range 512 of CT GT 510, and to transmit the value to the advertiser when possible. In another embodiment, the application running on mobile unit 502 may keep track of the unique IDs of GTs 506 and CT GTs 510 which it receives transmissions from, and it may keep track of the order in which it passes by these GTs and CT GTs. If the mobile unit 502 passes through the transmission range 508 of a GT 506 with unique ID 01 and then passes through the transmission range 508 a GT 506 with unique ID 02 without having passed through transmission range 512 of a CT GT 510 with unique ID 11, the application may deduce that the user of the mobile unit 502 has bypassed store 602 despite receiving an advertisement. In this case, the trigger sent by the GT 506 with unique ID 02 will cause the application to display a new advertisement offering an increased incentive to enter store 602.

Figure 7:
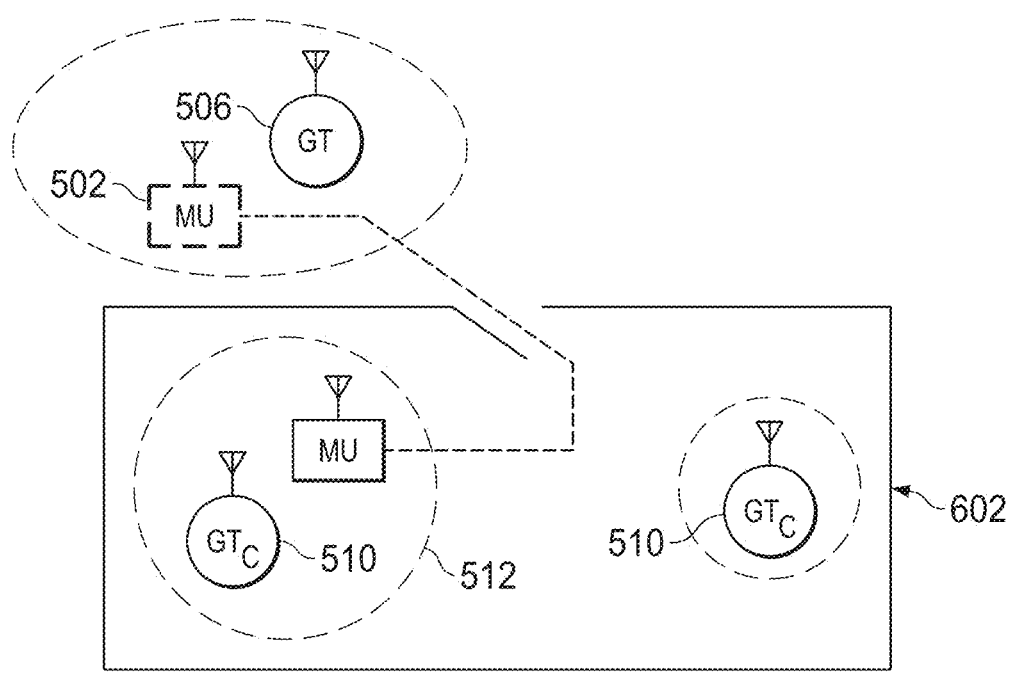
FIG. 7 illustrates a detail of one of the rooms in the retail environment.

Referring now to FIG. 7, a detailed illustration is shown of a mobile unit 502 entering a store 602. There may be more than one CT GT 510 inside of a store 602, allowing the system to gather further information on the movement of the mobile unit 602 within the store. For instance, it may be useful for an advertiser to know whether a mobile unit user has gone to a certain section of store 602 which contains the product which the user received an advertisement for. Furthermore, it may be useful for the advertiser to know whether the mobile unit user visited other section of the store as well, or whether the user left the store immediately after visiting the section containing the advertised-for product.

By placing the CT GT 510 inside the store and "linking" this operation to that of a GT outside of the store, it is possible for an advertiser to determine the information as to the effectiveness of a particular ad. If the GT 506 triggers an ad to the mobile unit 502 when it passes thereby, the advertiser would like to know if the user is actually attracted to the store. They can correlate the fact that the user saw the ad and then walked in the store within a predetermined amount of time and walked to a particular area of the store or just stayed in the store a certain amount of time. Just entering the store is some indication that the advertisement worked. Thus it is the correlation between the trigger that triggers the advertisement and the mobile user walking in to the store. All of this is achieved with no interaction by the user with the particular GT or with the advertiser. The application running on the phone, a proprietary application, will have associated therewith some type of pre-stored information as to a particular ad or the ability to pull an ad down from a remote network such as a data network. It is the triggering of this via a broadcast signal that causes the ad to be displayed to the user, or it could even be an audio output such as "please turn in here." It may be just the ID of the GT that is known to the application or the GT may transmit an advertising code. This will cause a counter to be initiated and then stop when the mobile unit reaches the transmission range of the GT 510. This provides a clear indication that the advertisement has worked.

Since the mobile unit works primarily on broadcast signals, the mobile unit collects the data. The GT 510 has no knowledge of any mobile unit walking within its range, since it is merely a broadcasting unit. Thus, the application running on the mobile unit will collect the data, i.e., it sees the unique ID from the GT 506 that triggers the application and starts the counter, and then it sees the unique ID of the GT 510 that tells it to stop the counter and accumulate the data. This also triggers an event that requires some type of communication with an advertiser. This can be an immediate transmission to another WiFi hub of some sort, or it can be a later upload via a data network on a mobile unit. This could be a pull operation or a push operation.

Figure 8:
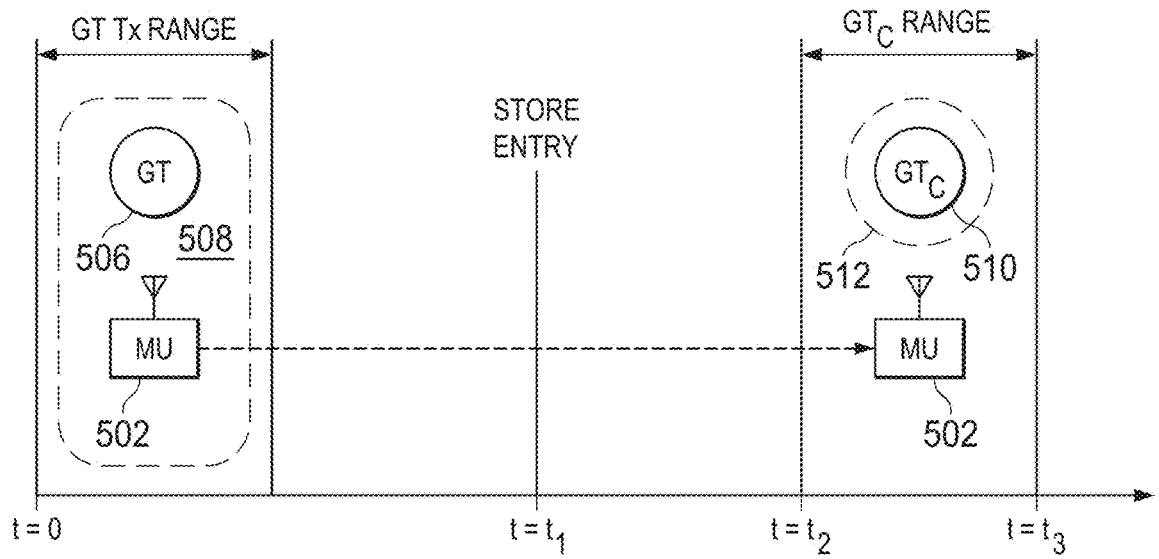
FIG. 8 illustrates a timeline for movement of mobile unit through the retail environment.

Referring now to FIG. 8, there is illustrated a time diagram of the system in operation. At time t=0 the mobile unit 502 enters the transmission range 508 of a GT 506 and an application running on the mobile unit 502 is triggered by the GT to perform a function, such as displaying an advertisement for a store 602. At time t=t1 the mobile unit 502 enters a desired location, such as the store 602. At time t=t2 the mobile unit 502 enters the transmission range 512 of a CT GT 510 and the application running on the mobile unit 502 is triggered to perform a further function, such as storing and sending a counter value representing elapsed time since t=0 to the advertiser. This elapsed time represents the time it took the mobile unit 502 to enter store 602 after receiving an advertisement for the store from a GT 506. At time t=t3 the mobile unit 502 leaves the transmission range 512 of CT GT 110, which may trigger the application running on mobile unit 502 to perform a further function, such as storing and sending a counter value representing elapsed time since t=t2 to the advertiser. This elapsed time represents the time the mobile unit 502 spent in the store 602, or in another embodiment the amount of time spent in a specific section of the store 602.

Figure 9:
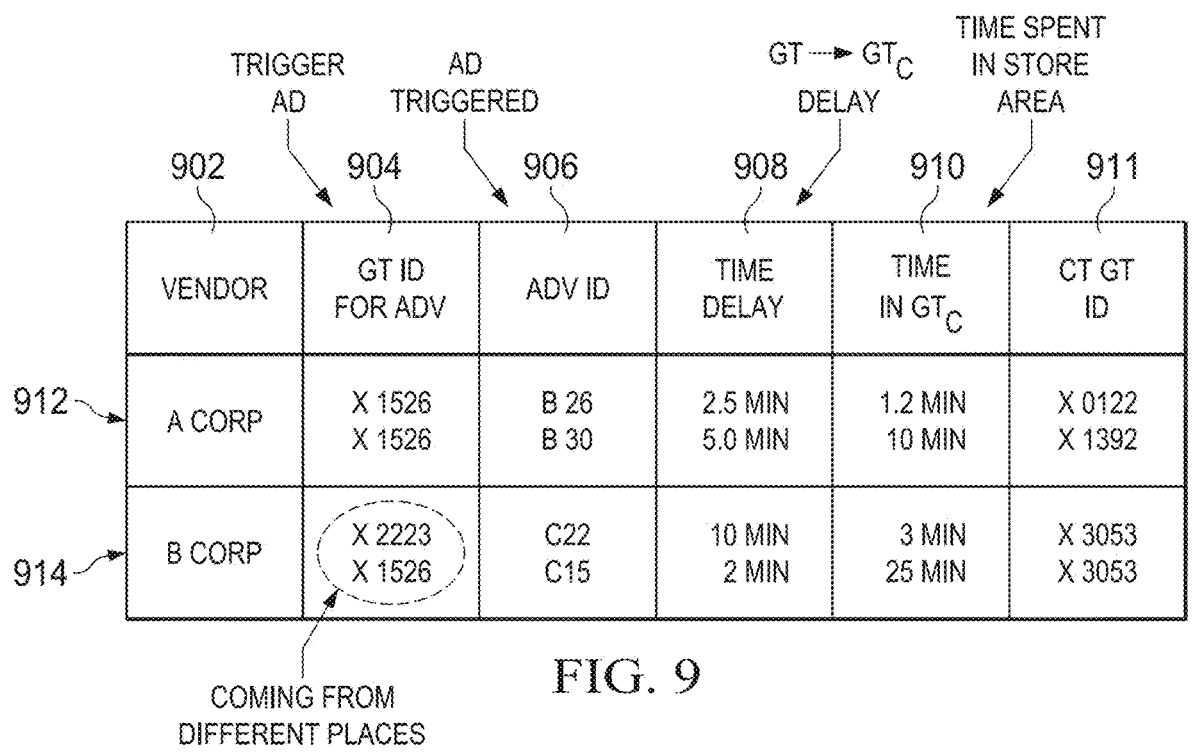
FIG. 9 illustrates a table depicting the information collected by the mobile unit.

Referring now to FIG. 9, there is illustrated a table of the information stored and transmitted by the mobile unit 502 after coming into contact with a GT 506 in an ideal embodiment of the system. Column 902 contains information on the vendor associated with an advertisement triggered by a GT 506. In an ideal embodiment, this vendor would be the owner of a store 602 or an advertiser hired by the owner of the store. Column 904 contains information representing the unique ID associated with the GT 506 which the mobile unit 502 has communicated with. Column 906 contains information representing an ID associated with an advertisement whose display has been triggered by the GT 506. This advertisement is contained in the mobile unit 502's memory, and the ID is used by the application running on mobile unit 502 to access the advertisement. Column 908 contains information representing the time elapsed between the mobile unit 502 communicating with the GT 506 and entering the transmission range 512 of a desired CT GT 510. Column 910 contains information representing the time elapsed between the mobile unit 502 entering and leaving the transmission range 512 of the desired CT GT 510. Column 911 contains information representing the unique ID associated with a CT GT 510 which the mobile unit 502 has communicated with. With reference to columns 908 and 910, a desired CT GT 510 is one which the vendor intends the mobile unit 502 to come in contact with after displaying an advertisement to the user of mobile unit 502. Each row 912 and 914 contains all information relating to one vendor. It can be seen that the information stored may be used to infer various things about the behavior of the user of mobile unit 502. For instance, the GT IDs in column 904 may show from which direction the user approached the store 602. Furthermore, the elapsed time information from column 908 may indicate to the vendor how effective their advertisement was in drawing the user to the store 602, while the elapsed time information in column 910 may indicate whether the user seriously investigated the store or just briefly looked around before leaving.

Figure 10:
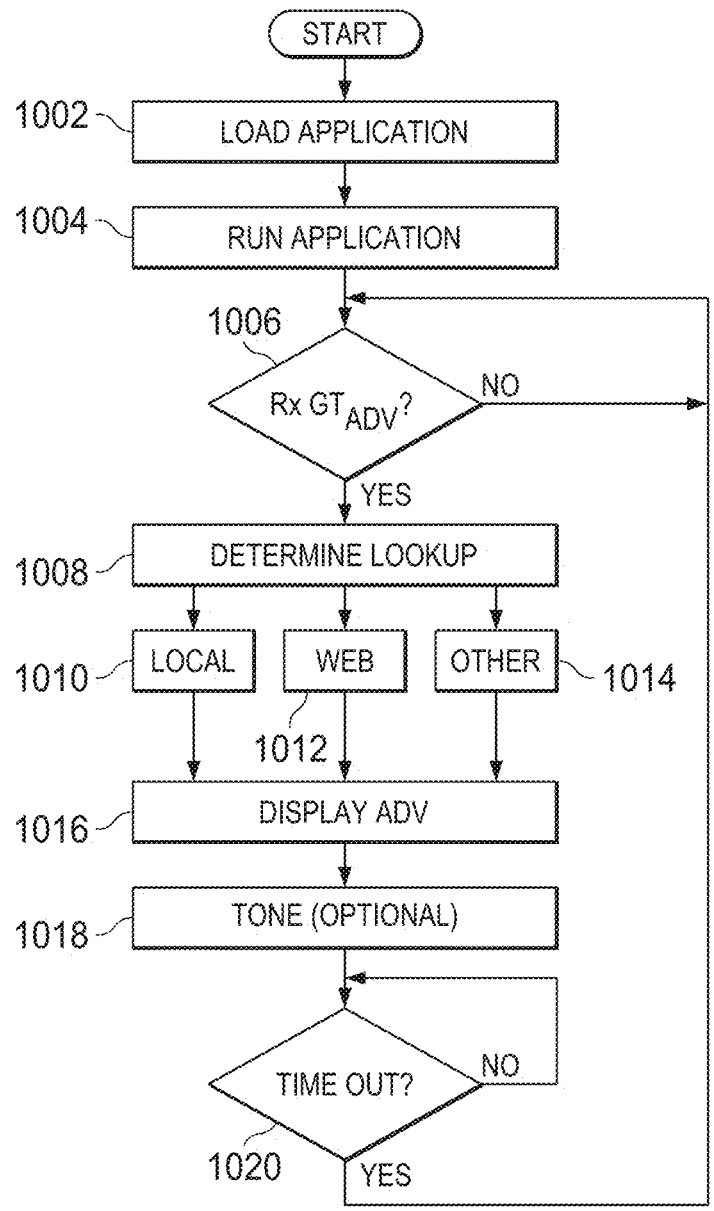
FIG. 10 illustrates a flow chart for loading the application.

Referring now to FIG. 10, there is illustrated a flowchart for an ideal embodiment of an application running on the mobile unit 502 which displays advertisements in response to instructions from a GT 506. At block 1002 the application is loaded into memory by the mobile unit 502. Flowing to block 1004, the application is run by the mobile unit 502. Flowing to block 1006, the application waits for a broadcast transmission containing information related to desired advertising information from a GT 506. Flowing to block 1008 when the desired transmission is received, the application checks to see where it needs to look up the desired advertising information which is associated with the received broadcast information. If the advertising information is stored locally on the mobile unit 502 then the application flows to block 1010 and loads the advertising information from local memory. If the advertising information is stored on the web then the application flows to block 1012 and loads the advertising information from the web. If the advertising information is stored elsewhere then the application flows to block 1014 and loads the advertising information from the appropriate location. Flowing to block 1016, the application displays the advertisement. Flowing to block 1018, the application optionally plays an audible tone or activates a vibration to alert the user of the advertisement. Flowing to block 1020, the application waits for the advertisement to time-out after a predetermined amount of time, after which the application flows back to block 1006 and waits to receive another transmission from a GT 506.

Figure 11:
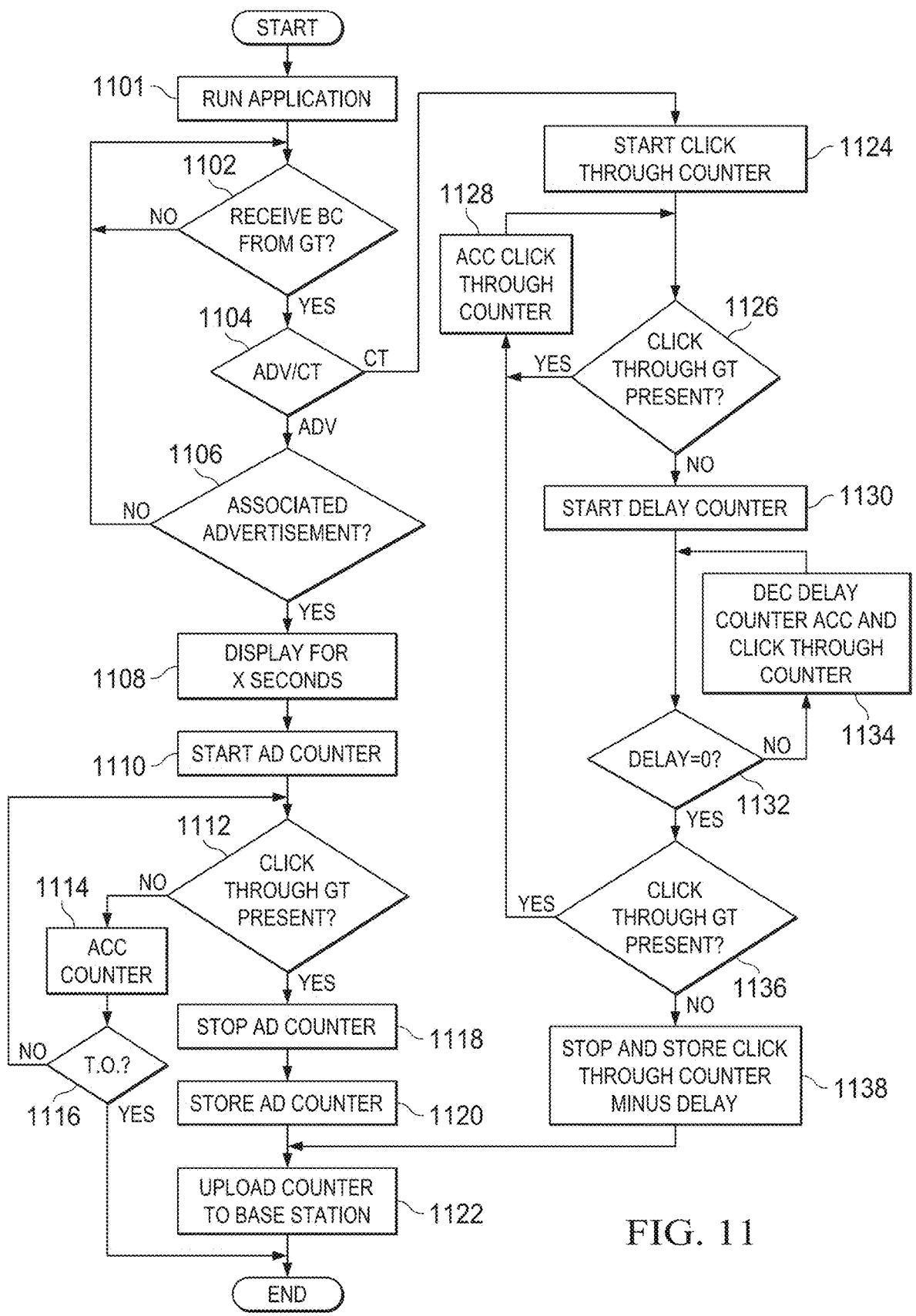
FIG. 11 illustrates a flow chart of the overall click-through operation.

Referring now to FIG. 11, there is illustrated a flowchart for an application running on the mobile unit 502 which records and transmits information representing the amount of time elapsed between displaying an advertisement and entering a location associated with the advertisement and representing the amount of time spent in a location associated with the advertisement. Starting at block 1102, the application waits to receive a broadcast from a GT 506. Flowing to block 1104, the application determines if the received broadcast information is related to advertisement information or a "clickthrough." If the received broadcast information is related to advertisement information then the application flows to block 1106 and determines if the received broadcast information is associated with an advertisement which the mobile unit 502 can retrieve. If not, the application returns to block 1102 and waits for another broadcast. Otherwise the application flows to block 1108 and displays the advertisement for a predetermined amount of time. The application then flows to block 1110 and begins an "advertisement counter." Flowing to block 1112 the application looks for a "clickthrough" GT signal. If the clickthrough GT is not present the application flows to block 1114 and increments the advertisement counter, then flows to block 1116 and checks whether a predetermined time-out threshold has been reached. If the time-out threshold has been reached then the mobile unit user has likely ignored the advertisement and the application ends. If the time-out threshold has not been reached, then the application returns to block 1112 and continues checking for the clickthrough GT signal. When a clickthrough GT signal is present, the application flows to block 1118 and stops the advertisement counter, then flows to block 1120 and stores the accumulated advertisement counter value. Flowing to block 1122 the application uploads the counter to a base station 504. The application then ends.

Returning to block 1104, if the received broadcast information is related to a clickthrough GT then the application flows to block 1124 and begins a "clickthrough counter." Flowing to block 1126 the application checks to make sure that it is continuing to receive a broadcast clickthrough GT signal. If it does continue to receive a broadcast clickthrough GT signal, then the application flows to block 1128 and accumulates the clickthrough counter, then flows back to block 1126 to continue checking for the broadcast clickthrough GT signal. When the broadcast clickthrough GT signal is no longer present the application flows to block 1130 and begins decrementing a "delay counter" from a predetermined amount of time. Flowing to block 1132 the application checks to see if the delay counter has reached zero. If not, the application decrements the delay counter while continuing to increment the clickthrough counter and flowing back to block 1132 to continue checking for the delay counter reaching zero. When the delay counter has reached zero, the application flows to block 1136 and checks to see if the mobile unit has begun receiving the broadcast clickthrough GT signal once again. If so, the application flows back to block 1128 and accumulates the clickthrough counter, then flows once more to block 1126 to continue checking for the presence of the broadcast clickthrough GT signal. If, after the delay counter has reached zero at block 1132, the broadcast clickthrough GT signal is not present then the application flows to block 1138 where it stops and stores the clickthrough counter value minus the initial delay counter value for an end value representing the amount of time spent inside the range of the clickthrough GT. The application then flows to block 1122 and uploads the clickthrough counter value to a base station 504. The application then ends.

Figure 12:
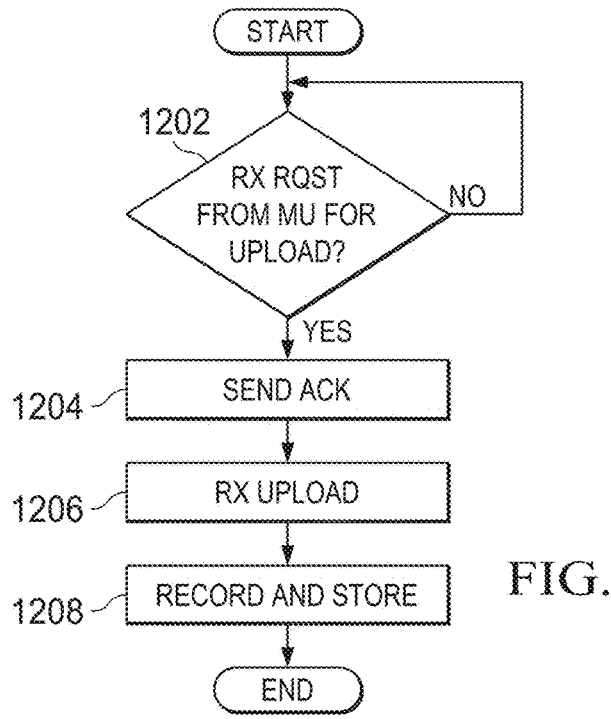
FIG. 12 illustrates a flow chart for the uploaded information to the central location.

Referring now to FIG. 12, there is illustrated a flowchart for the behavior of the base station 504 when the mobile unit 502 wants to transmit information such as that detailed in FIG. 9. At block 1202 the base station waits to receive a request from the mobile unit 502 to upload information to the base station 504. Once it receives this request, the base station flows to block 1204 and sends an acknowledgment of the request to mobile unit 502. Flowing to block 1206, the base station receives the upload from mobile unit 502. Flowing to block 1208, the base station records and stores the uploaded information.

Figure 13:
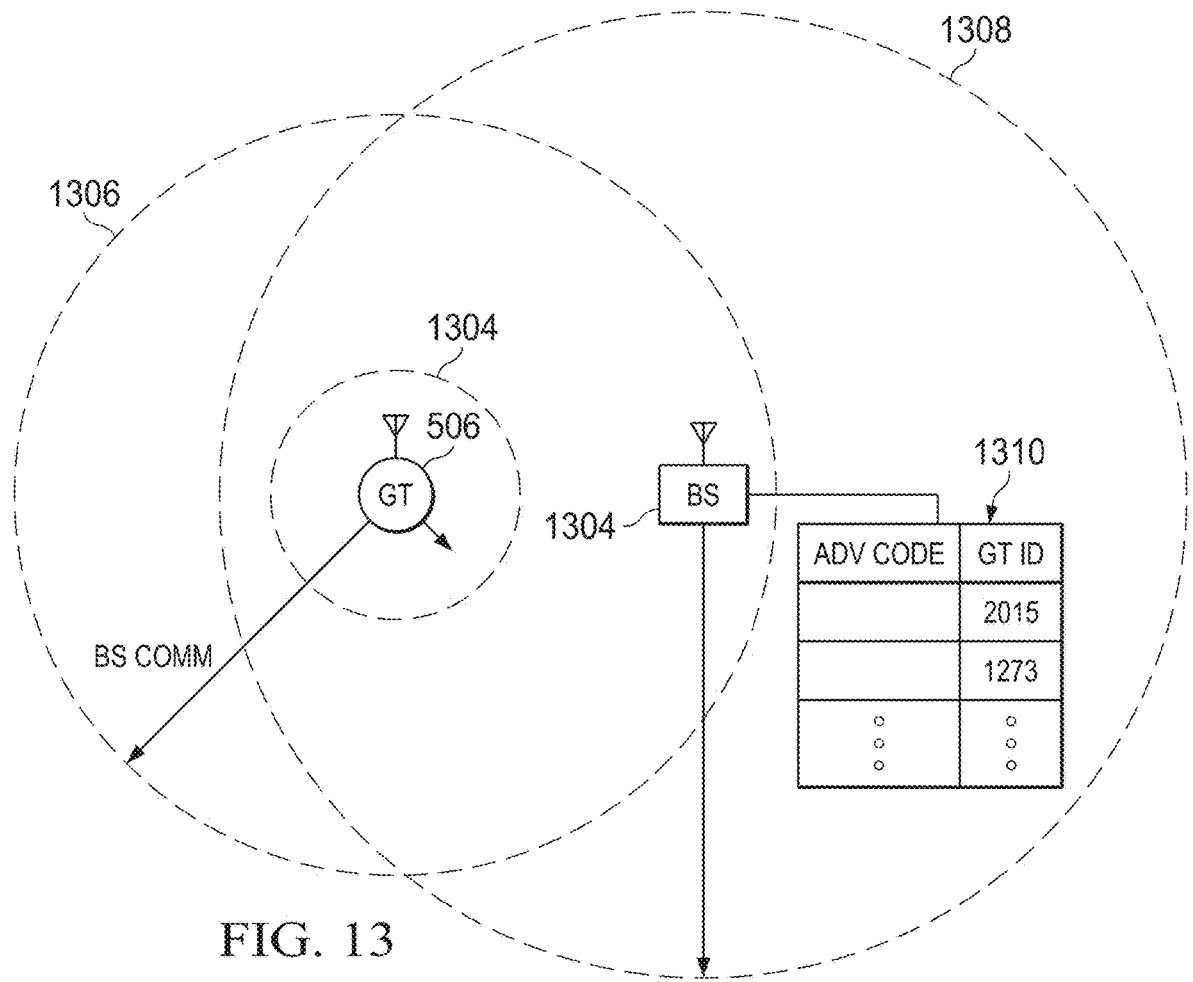
FIG. 13 illustrates a diagrammatic view of the geotag communicating with the base station.

Referring now to FIG. 13, there is illustrated in detail communications between a GT 506 or a CT GT and a base station 504 and the transmission capability of a GT 506 or a CT GT. The GT or CT GT is able to alter the power of its transmission signal to increase or decrease the effective range at which its transmissions may be received. In a default mode the GT 506 uses low power to transmit with a very short effective range 1304. This power setting is used to broadcast, for instance, advertising or clickthrough information to mobile units which enter close proximity with the GT or CT GT. The GT 506 or CT GT is also able to increase its transmission power to reach a much larger effective range 1306. This transmission range may be large enough to communicate, for instance, with a base station 504. This power setting is used, for instance, to request updated information from the base station or to notify the base station of the GT's location. The base station 504 has a transmission range 1308 and communicates with any GTs or CT GTs within this range. The base station may contain information such as a table 1310 which associates codes representing a particular advertisements with unique IDs associated with individual GTs or CT GTs. Communication between the GTs or CT GTs and the base station may facilitate the base station updating an advertisement code stored within a GT or CT GT, a new GT or CT GT registering its location with the base station, or a GT or CT GT uploading other information to the base station, such as the counter information generated in the process of FIG. 11.

Figure 14:
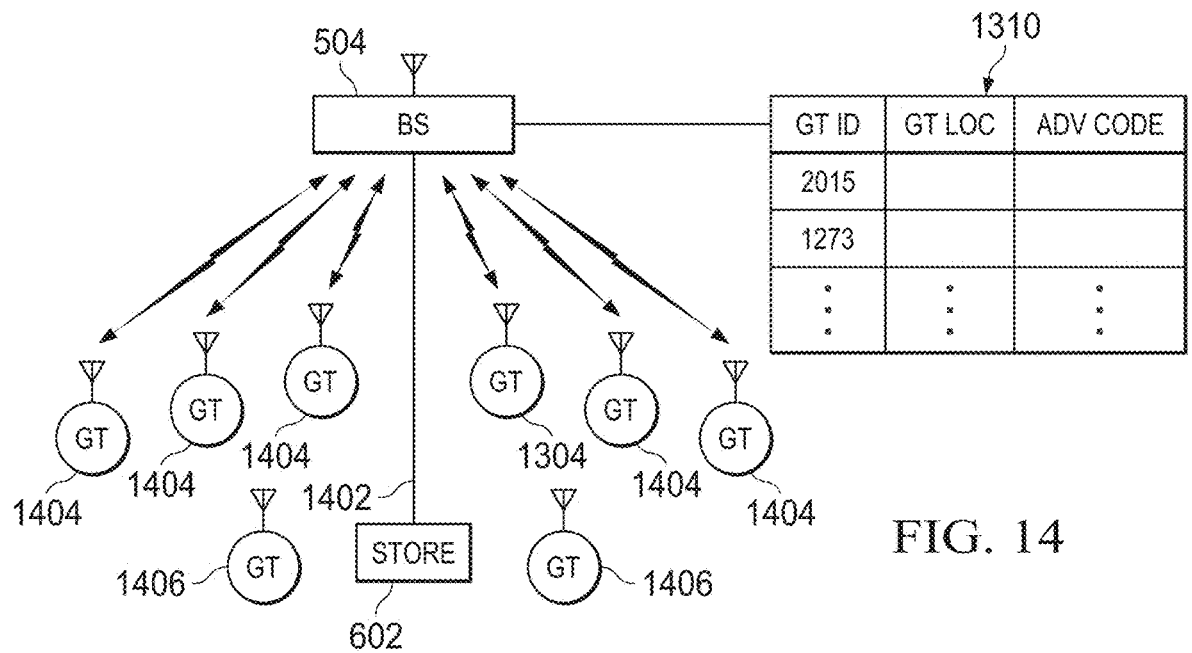
FIG. 14 illustrates the ability of downloading information to the geotag to the base station.

Referring now to FIG. 14, there is illustrated an embodiment of a process wherein a set of GTs are configured to transmit a particular advertisement code based on their proximity to a vendor location to trigger display of an advertisement. An array of GTs 506 are placed around a vendor location 602 which is in communication with a base station 504. The base station 504 and vendor location 602 are connected in an ideal embodiment by a wireline communication service 1402. When the vendor decides to distribute an advertisement to mobile units 502 passing in proximity to the vendor location 602 it communicates with the base station 504 through the wireline communication service 1402. The base station 504 has, in an ideal embodiment, a table of unique IDs 1310 associated with information about the physical location of individual GTs 506 and advertisement codes. The base station 504 determines a sub-set of GTs 1404 which are within the desired proximity of vendor location 602 and updates the advertisement codes associated with those GTs 1404 to a code associated with information about the desired advertisement of vendor location 602. In an ideal embodiment this information may include an ID for the advertisement and information about where a mobile unit 502 should retrieve the advertisement from. The base station 504 then transmits to the set of GTs 1404 and instructs them to update the information contained within GTs 1404 to reflect the desired advertisement of vendor location 602. There remain a set of GTs 1406 which are outside of the proximity which is desired by vendor location 602 and which are not updated by base station 504.

Figure 15:
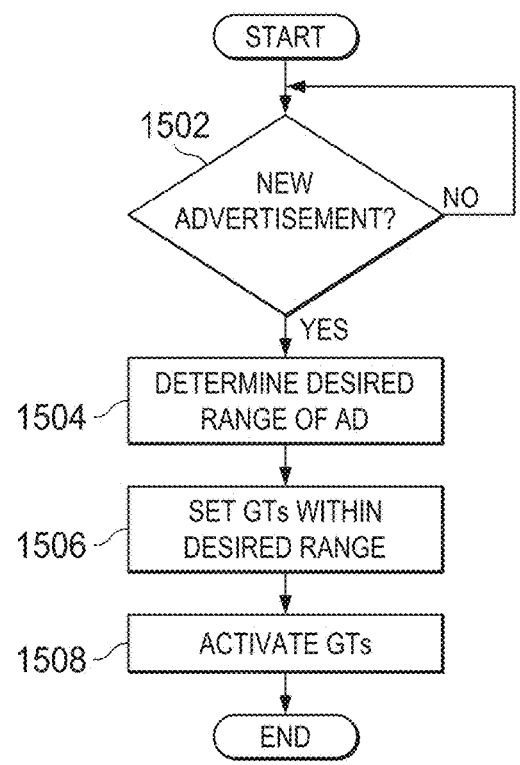
FIG. 15 illustrates a flow chart for generating new advertisements for transmission to the geotag.

Referring now to FIG. 15, there is illustrated a flow chart describing the process by which a base station 504 updates GTs 1404. Beginning at block 1502 the base station determines whether a new advertisement is requested. If so, the process flows to block 1504 and the base station determines a desired range over which the advertisement is to be distributed. Flowing to block 1506, the base station communicates with GTs within the desired range, updating the advertisement code that they contain. Flowing to block 1508, the base station instructs the GTs within the desired range to begin broadcasting the newly updated advertisement code.

Figure 16:
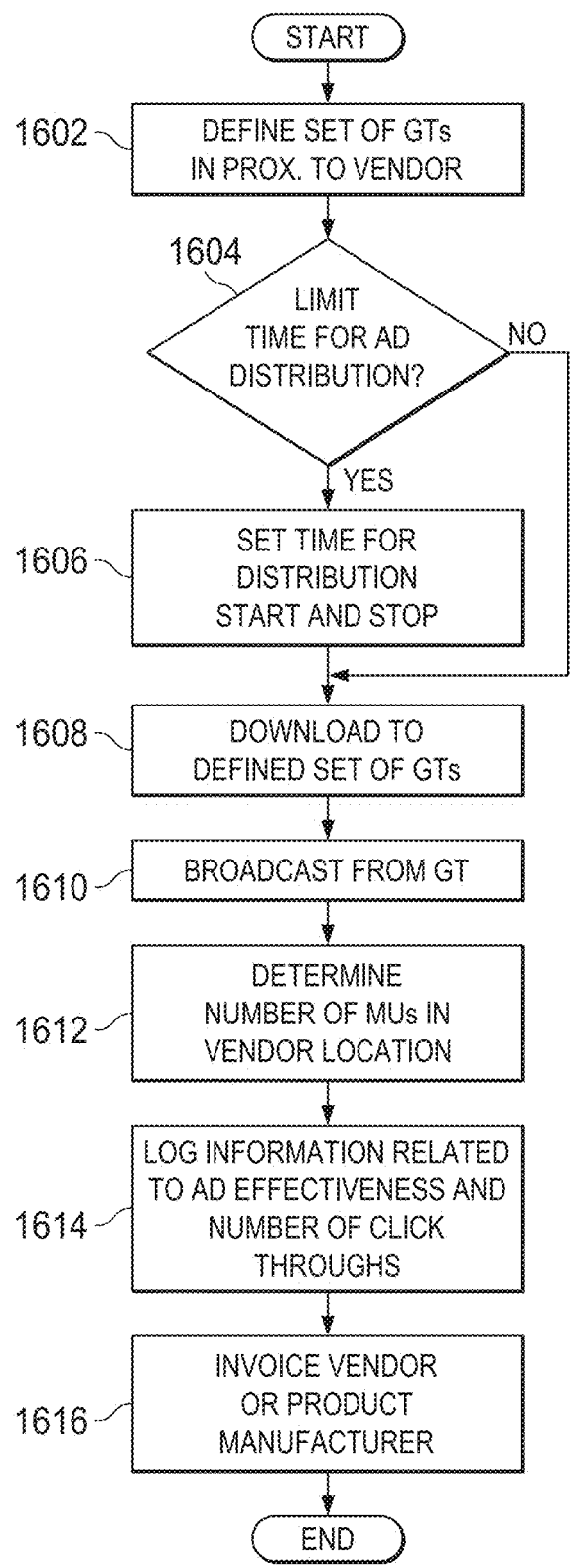
FIG. 16 illustrates a flow chart defining an alternate technique for the geotag operation.

Referring now to FIG. 16, there is illustrated a flow chart describing a method for monetizing geotag advertising and geotag clickthroughs. The advertisement in this scenario may be one for a vendor's location, such as a store, or it may be for a specific product sold at multiple different vendors. Beginning at block 1602, a set of geotags within a desired proximity to a vendor location is defined. Flowing to block 1604, the system chooses whether or not to limit the time for which the advertisement will be distributed. If not, the system skips ahead to block 1608. If a time limit is desired, however, the system flows to block 1606 and the start and stop time for distribution is set. Flowing to block 1608, the advertisement information and the start and stop time for distribution of the advertisement is downloaded to the previously defined set of geotags. Flowing to block 1610, the geotags broadcast the advertisement information. Flowing to block 1612, the system determines the number of mobile units which have entered the vendor location. Flowing to block 1614, the system logs information related to the advertisement effectiveness and the number of geotag clickthroughs as described above. Flowing to block 1616, the system invoices the vendor or product manufacturer based on the advertisement effectiveness and the number of clickthroughs.

Figure 17:
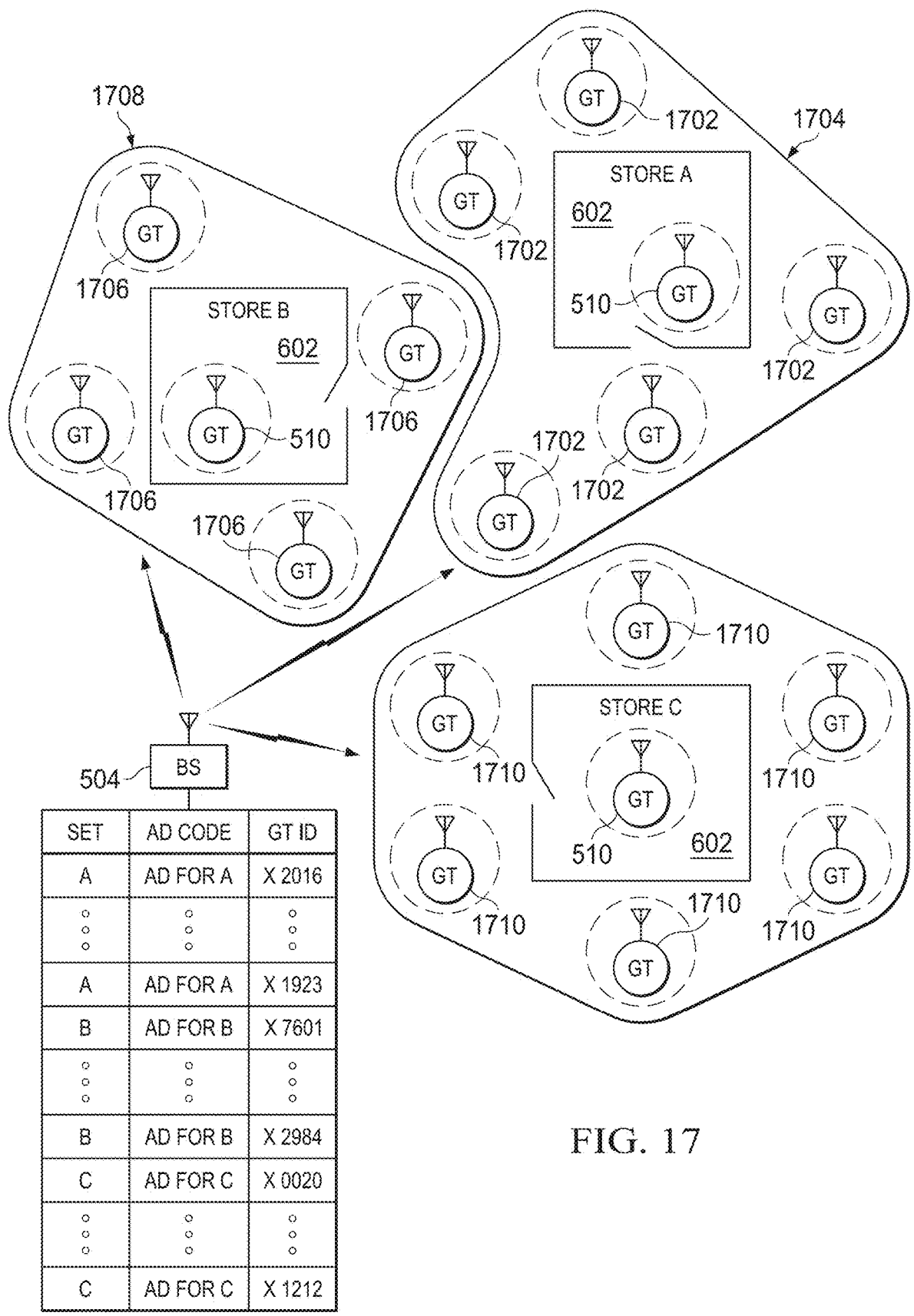
FIG. 17 illustrates a diagrammatic of multiple areas for geotags wherein geotags can be programmed to increase or decrease the number thereof.

Referring now to FIG. 17, there is illustrated an embodiment of the system in which multiple vendors are simultaneously advertising in proximity to their locations via geotags. There are various vendor locations 602, each of which has at least one clickthrough geotag 510 on their premises and each of which has chosen a proximity 1704, 1708 and 1712 around their location in which to advertise. Separate sets of geotags 1702, 1706 and 1710 are designated to carry advertisements for each vendor location. Geotags 1702 are designated within the area 1704 to advertise for the vendor location 602 labeled as store A. Similarly, geotags 1706 are designated within the area 1708 to advertise for store B and geotags 1710 are designated within the area 1712 to advertise for store C. A base station 504 coordinates these designations, downloads desired advertisement information to the geotags and gives them any other necessary instructions. A table such as 1714 is contained inside the base station 504 and contains information relating each unique geotag ID with its advertisement code and any other necessary information.

It will be appreciated by those skilled in the art having the benefit of this disclosure that this use of localized broadcast signals to modify mobile application behavior provides an advertiser with a tool that allows them to deliver an ad to a phone and then determine if the phone has entered the store where the ad attracts the consumer to. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method for tracking advertisement effectiveness on an advertisement associated with an advertiser including an application on a mobile unit, comprising the steps of:

sending, from a base station, a sync pulse to a plurality of fixed information nodes and to the mobile unit within a restricted information broadcast range;

broadcasting, upon receipt of the sync pulse, first control information associated with desired advertising information from at least one of the plurality of fixed information nodes;

receiving, at the application executed by the mobile unit, the broadcast first control information when the mobile unit is within the restricted information broadcast range associated with the at least one of the fixed information nodes;

retrieving, by the application executed by the mobile unit, the desired advertising information in reliance on the first control information;

providing a collision avoidance period between the steps of broadcasting the first control information from the at least one of the plurality of fixed information nodes and retrieving the desired advertising information by the application executed by the mobile unit, in order to avoid collision of data transmitted from either the at least one of the plurality of fixed information nodes or the base station to the mobile unit;

controlling the mobile unit by the application executed by the mobile unit to provide an output, for viewing by a user of the mobile unit, of the desired advertising information associated with the received broadcast information triggered by the receipt at the application executed by the mobile unit of the broadcast first control information;

starting an advertisement counter by the application executed by the mobile unit at a time of receipt of the broadcast first control information;

broadcasting, upon receipt of the sync pulse, presence information associated with a vendor from at least another of a plurality of fixed information nodes associated with the fixed information nodes over an associated restricted vendor broadcast range;

receiving the broadcast presence information at the application executed by the mobile unit;

starting a presence counter by the application executed by the mobile unit in response to initial receipt of the presence information and stopping the advertisement counter by the application executed by the mobile unit to provide an indication between the time of receipt by the application executed by the mobile unit of the broadcast first control information and a time of receipt of the received broadcast presence information;

detecting, by the application executed by the mobile unit, loss of receipt of the broadcast presence information indicating the mobile unit and the user have left the restricted vendor broadcast range;

stopping the presence counter by the application executed by the mobile unit; and uploading, by the application executed by the mobile unit, the advertisement counter to a base station.

2. The method of claim 1, wherein the broadcast information is continuously broadcast from a plurality of the fixed nodes.

3. The method of claim 1, wherein the mobile unit is a handheld device.

4. The method of claim 3, wherein the handheld device is a mobile phone.

5. The method of claim 1, further comprising the step of storing the desired advertising information in memory in the mobile unit.

6. The method of claim 5, wherein the information related to the received broadcast information associated with desired advertising information is stored in association with the associated desired advertising information in the mobile unit.

7. The method of claim 1, wherein the advertisement counter is in the mobile unit.

8. The method of claim 1, further comprising the step of determining that the broadcast of presence information is associated with the received broadcast information associated with desired advertising information.

9. The method of claim 1, wherein the presence counter is in the mobile unit.

10. The method of claim 1, wherein the advertising information is output from the mobile unit as a visible advertisement.

11. The method of claim 1, wherein the advertising information is output from the mobile unit as an audible advertisement.

12. The method of claim 1, wherein the information related to the received broadcast presence is stored in memory on the mobile unit.

13. The method of claim 1, further comprising the step of uploading information related to the received broadcast presence to a base station.

14. The method of claim 1, wherein the advertisement counter is stored in memory on the mobile unit.

15. The method of claim 1, further comprising the step of uploading the presence counter to a base station.

16. The method of claim 15, wherein the presence counter is stored in the mobile unit.

17. The method of claim 1, wherein the restricted information broadcast range of each of the fixed information nodes is a fixed broadcast range outside of which the mobile unit cannot communicate therewith and receive information therefrom.

18. The method of claim 1, wherein retrieving the desired advertising information includes determining, by the application executed by the mobile unit, that the received broadcast first control information is associated with the desired advertising information.

19. The method of claim 1, wherein the at least another one of the plurality of fixed information nodes is disposed in a predetermined fixed physical proximity with a vendor location, and wherein the restricted information broadcast range for the at least one of the fixed information nodes and the restricted vendor broadcast range associated with the at least another of the fixed information nodes can be different.

20. The method of claim 19, wherein the presence counter indicates that the mobile unit and the user have entered the restricted vendor broadcast range, and wherein the presence counter continues to count as long as the application executed by the mobile unit is continually receiving presence information while in the restricted vendor broadcast range.

* * * * *